United States Patent
Schelstraete et al.

(10) Patent No.: US 8,325,825 B2
(45) Date of Patent: Dec. 4, 2012

(54) METHOD AND APPARATUS FOR OPTIMIZING DYNAMIC RANGE IN DMT MODEMS

(75) Inventors: Sigurd Schelstraete, Menlo Park, CA (US); Qasem Aldrubi, Fremont, CA (US); Hossein Dehghan-Fard, Danville, CA (US)

(73) Assignee: Ikanos Communications, Inc., Fremont, CA (US)

( * ) Notice: Subject to any disclaimer, the term of this patent is extended or adjusted under 35 U.S.C. 154(b) by 402 days.

(21) Appl. No.: 12/799,607

(22) Filed: Apr. 27, 2010

(65) Prior Publication Data

US 2010/0272164 A1    Oct. 28, 2010

Related U.S. Application Data

(60) Provisional application No. 61/173,195, filed on Apr. 27, 2009.

(51) Int. Cl.
*H04B 3/00* (2006.01)
(52) U.S. Cl. ........................................ 375/257; 375/222
(58) Field of Classification Search .......... 375/219–222, 375/257–258
See application file for complete search history.

(56) References Cited

U.S. PATENT DOCUMENTS

| | | | |
|---|---|---|---|
| 5,687,229 A * | 11/1997 | Sih | 379/406.09 |
| 6,178,161 B1 * | 1/2001 | Terry | 370/276 |
| 6,212,273 B1 * | 4/2001 | Hemkumar et al. | 379/406.08 |
| 6,434,110 B1 * | 8/2002 | Hemkumar | 370/201 |
| 2002/0042256 A1 * | 4/2002 | Baldwin et al. | 455/232.1 |
| 2002/0105964 A1 | 8/2002 | Sommer et al. | |
| 2002/0176509 A1 * | 11/2002 | Gatherer et al. | 375/260 |
| 2006/0210054 A1 | 9/2006 | Stiscia | |
| 2007/0036124 A1 * | 2/2007 | Kurtz | 370/344 |

* cited by examiner

*Primary Examiner* — Emmanuel Bayard
(74) *Attorney, Agent, or Firm* — Mark J. Danielson; Pillsbury Winthrop Shaw Pittman LLP

(57) ABSTRACT

A digital subscriber line 'XDSL' communication system for optimizing dynamic range in digital multi-tone modulated (DMT) modems. The system comprises a digital subscriber line access multiplexer (DSLAM) and at least one modem. The DSLAM distributes a near end crosstalk (NEXT) model of anticipated disturbance from neighboring disturber subscriber lines. The at least one modem has shared and discrete components forming a transmit path and a receive path. The at least one modem couples to the DSLAM and is responsive to the distributed NEXT model there from to adjust a dynamic range of an analog portion of the receive path to accommodate the anticipated disturbance modeled in the distributed NEXT model.

16 Claims, 6 Drawing Sheets

60 Pair Bundle

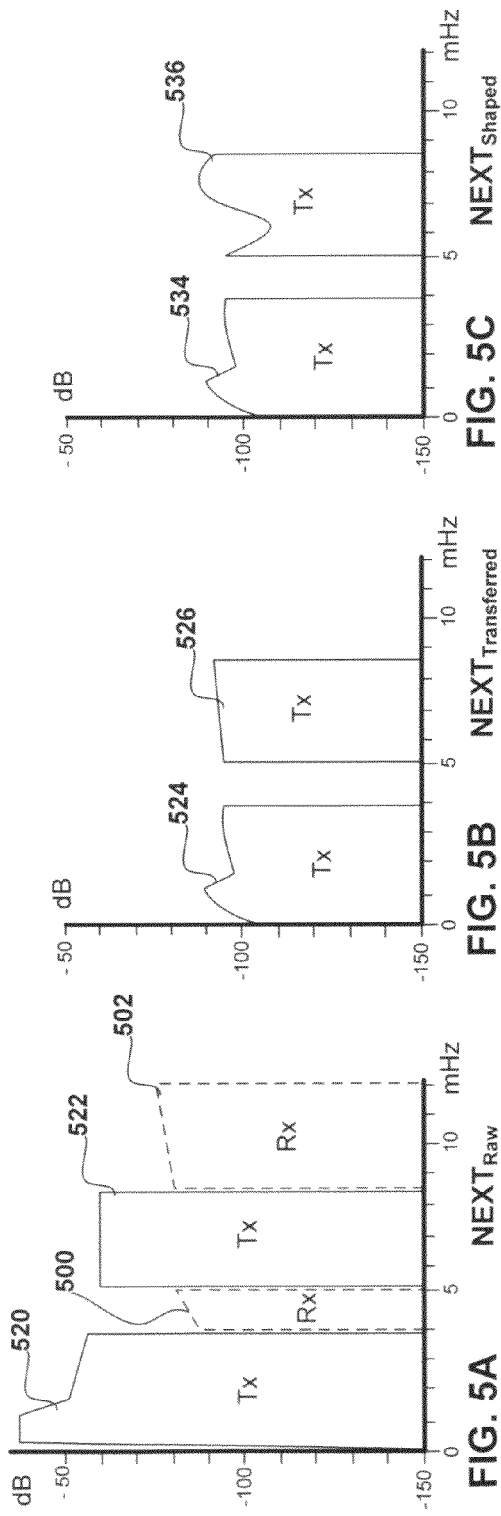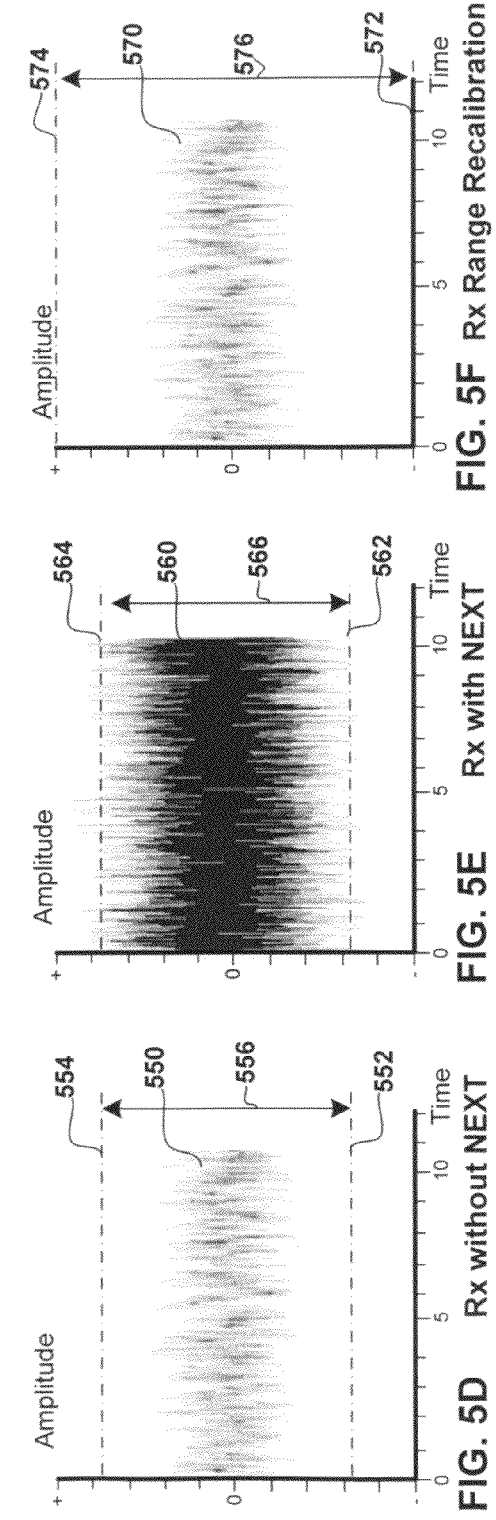

METHOD AND APPARATUS FOR OPTIMIZING DYNAMIC RANGE IN DMT MODEMS

CROSS REFERENCE TO RELATED APPLICATION

This application claims the benefit of prior filed co-pending Provisional Applications No. 61/173,195 filed on Apr. 27, 2009 entitled "Optimization of Dynamic Range for SOS and Virtual Noise" which is incorporated herein by reference in its entirety as if fully set forth herein.

BACKGROUND OF THE INVENTION

1. Field of Invention

This invention relates generally to communications, and more particularly, to a method and apparatus for multi-line digital subscriber line communications. The invention allows the modems to determine an optimal dynamic range setting of the analog front-end, even in a time-variant noise environment.

2. Description of the Related Art

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem may operate simultaneously with a voice band modem or a telephone conversation. Currently there are over ten discrete X-DSL standards, including: G.Lite, ADSL, VDSL, SDSL, MDSL, RADSL, HDSL, etc. Among these, ADSL and VDSL variants have been most widely deployed. These particular X-DSL technologies have all been implemented with a multi-tone (DMT) line code, or modulation protocol.

The primary factor limiting the bandwidth or channel capacity of any of the above discussed X-DSL protocols is noise, whether that noise be from echo, channel cross talk, impulse or background sources. Efforts are made throughout the DSL architecture to minimize noise.

For voice applications a certain amount of echo was considered a positive feedback for telephone conversations until the longer delays introduced by satellite links permeated the system. For a DSL system echo effects signal integrity and introduces unacceptable errors in data transmissions. An echo canceller synthesizers the echo path including the digital analog converter, the transmit filter, the hybrid circuit, the receiver filter, in the analog-to-digital converter. An echo canceller can produce an echo replica with the same transmitting data but with reverse signed to cancel the real echo on the receive path.

The topology of subscriber lines themselves may be used to minimize cross-talk between subscriber lines. Typically, telephone subscriber loops are organized in a binder with 10, 25, or 50 pairs each sharing a common physical or electrical shield in a cable. Due to capacitance and inductive coupling there's cross-talk between each twisted pair even though the pairs are well insulated for DC. The effective cross-talk is reduced by adapting different twist distances among different pairs in the binder group. Binder groups are also twisted such that no two groups are adjacent for long runs.

The hybrid circuit which couples the modem to the subscriber line is also designed with noise reduction in mind. The hybrid is basically a bridge circuit which allows bi-directional communication on the subscriber line. When the bridge is balanced the spillover of noise from the modem's transmitted signal to the received signal is reduced. Balancing however requires an impedance match with the telephone subscriber loop which is never fully satisfied because the input impedance of the telephone loop varies from one loop to the next due to taps and temperature variations in the individual subscriber lines.

Cross-talk noise comes from a adjacent telephone subscriber loops of the same or different types of transmission systems. Cross-talk is divided into what is known as near end cross talk (NEXT) and far end cross-talk (FEXT) depending on where the cross-talk is generated. NEXT is defined as cross-talk between subscriber lines in a binder coupled on one end with a common transceiver. FEXT is defined as a cross-talk affect between a receiving path and a transmitting path of the DSL transceivers on opposite ends of two to different subscriber loops within the same twisted pair cable or binder. The FEXT noise at the receiver front end of a particular DSL transceiver is caused by signals transmitted by other transceivers at the opposite end of the twisted cable.

What is needed is modem with improved capabilities for communications in the presence of crosstalk.

SUMMARY OF THE INVENTION

The present invention advantageously provides a method and apparatus for optimizing dynamic range in digital multi-tone modulated (DMT) modems.

In an embodiment of the invention a digital subscriber line 'XDSL' communication system for provisioning multi-tone modulated communications over a subscriber line is disclosed. The system comprises a digital subscriber line access multiplexer (DSLAM) and at least one modem. The DSLAM distributes a near end crosstalk (NEXT) model of anticipated disturbance from neighboring disturber subscriber lines. The at least one modem has shared and discrete components forming a transmit path and a receive path. The at least one modem couples to the DSLAM and is responsive to the distributed NEXT model there from to adjust a dynamic range of an analog portion of the receive path to accommodate the anticipated disturbance modeled in the distributed NEXT model, whereby the adjusted range is large enough to substantially avoid clipping of a received signal and at the same time not so large as to result in significant excess dynamic range.

In another embodiment of the invention a XDSL modem for provisioning XDSL multi-tone modulated communications over a subscriber line is disclosed. The modem comprises: a plurality of shared and discrete components forming a transmit path and a receive path for modulating and demodulating an XDSL communication channel. The modem further comprises a near end crosstalk (NEXT) model of anticipated disturbance from neighboring disturber subscriber lines and a range optimizer component coupled to the receive path, and responsive to the NEXT model to adjust a dynamic range of an analog portion of the receive path to accommodate the anticipated disturbance modeled in the distributed NEXT model, whereby the adjusted range is large enough to substantially avoid clipping of a received signal and at the same time not so large as to result in significant excess dynamic range. Associated method and means are also disclosed.

BRIEF DESCRIPTION OF THE DRAWINGS

These and other features and advantages of the present invention will become more apparent to those skilled in the art from the following detailed description in conjunction with the appended drawings in which:

FIGS. 5A-5C and 5D-5F are frequency and time domain signal diagrams respectively of neighbor NEXT as it effects the receive path of a modem.

DETAILED DESCRIPTION OF THE EMBODIMENTS

A method and apparatus is disclosed for optimizing the dynamic range of modems. The modems, a.k.a. line cards may be found in a central office, remote access terminal, business or home. The line cards support communication channels with differing degrees of robustness for multi-tone protocols including: asymmetric digital subscriber line (ADSL); very high bit rate digital subscriber line (VDSL) and other orthogonal frequency division multiplexing (OFDM) band plans including but not limited to the following:

TABLE 1

| Standard name | Common name | Downstream rate | Upstream rate |
| --- | --- | --- | --- |
| ANSI T1.413-1998 Issue 2 | ADSL | 8 Mbit/s | 1.0 Mbit/s |
| ITU G.992.1 | ADSL (G.DMT) | 8 Mbit/s | 1.0 Mbit/s |
| ITU G.992.1 Annex A | ADSL over POTS | 8 Mbit/s | 1.0 MBit/s |
| ITU G.992.1 Annex B | ADSL over ISDN | 8 Mbit/s | 1.0 MBit/s |
| ITU G.992.2 | ADSL Lite (G.Lite) | 1.5 Mbit/s | 0.5 Mbit/s |
| ITU G.992.3/4 | ADSL2 | 12 Mbit/s | 1.0 Mbit/s |
| ITU G.992.3/4 Annex J | ADSL2 | 12 Mbit/s | 3.5 Mbit/s |
| ITU G.992.3/4 Annex L | RE-ADSL2 | 5 Mbit/s | 0.8 Mbit/s |
| ITU G.992.5 | ADSL2+ | 24 Mbit/s | 1.0 Mbit/s |
| ITU G.992.5 Annex L[1] | RE-ADSL2+ | 24 Mbit/s | 1.0 Mbit/s |
| ITU G.992.5 Annex M | ADSL2 + M | 24 Mbit/s | 3.5 Mbit/s |
| ITU G.993.1 | VDSL | | |
| ITU G.993.2 | VDSL 2 | | |

Figure 1:
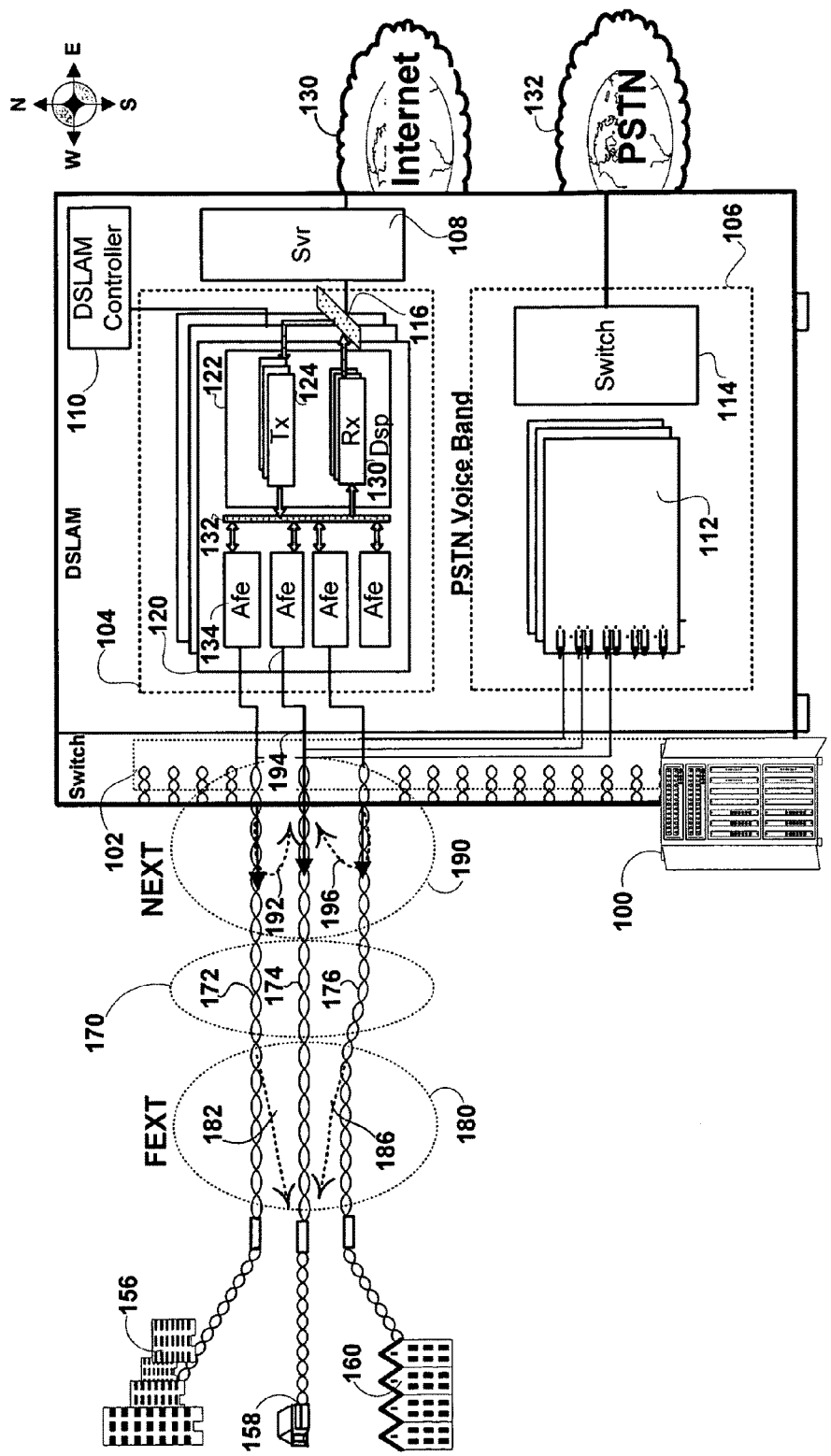
FIG. 1 shows a communication system with a pair of multi-mode multi-channel modem line cards coupled to one another by a binder of subscriber lines between a public switched telephone network (PSTN) central office (CO) and remote sites.

FIG. 1 shows a communication system with a pair of multi-mode multi-channel modem line cards coupled to one another by a binder of subscriber lines between a public switched telephone network (PSTN) central office (CO) and a remote site. The system includes a CO 100 and a remote transceivers 156, 158, 160. The CO and remote line card are coupled to one another via a subscriber line binder 170 which includes individual subscriber lines 172, 174, 176.

Each of the subscriber line connections terminates on the CO end, in the frame room 102 of the CO. From this room connections are made for each subscriber line via splitters and hybrids to both a DSLAM 104 and to the voice band racks 106. The splitter shunts voice band communications to dedicated line cards, e.g. line card 112 or to a voice band modem pool (not shown). The splitter shunts higher frequency X-DSL communications on the subscriber line to a selected line card, e.g. line card 120, within DSLAM 104. The line cards of the current invention are universal, meaning they can handle any current or evolving standard of X-DSL and may be upgraded on the fly to handle new standards.

Voice band call set up is controlled by a Telco switch matrix 114 such as SS7. This makes point-to-point connections to other subscribers for voice band communications across the public switched telephone network 132. The X-DSL communications may be processed by a universal line card such as line card 120. That line card includes a plurality of AFE's 134 each capable of supporting a plurality of subscriber lines. The AFEs are coupled via a packet based bus 132 to the DSP 122. For downstream communications from the CO to the remote site, the DSP modulates the data for each communication channel, the AFE transforms the digital symbol packets assembled by the DSP and converts them to an analog signal which is output on the subscriber line associated with the respective channel. For upstream communications from the remote site to the CO the AFE each received channel is converted to a digitized data sample which is sent to the DSP. The DSP is capable of multi-protocol support for all subscriber lines to which the AFE's are coupled. Communications between AFE's, and DSP(s) may be packet based. The DSP 122 is shown with transmit path components 124 and receive path components 130. The line card 120 is coupled to a back-plane bus 116 which may be capable of offloading and transporting low latency X-DSL traffic between other DSPs for load balancing. The back-plane bus of the DSLAM also couples each line card to the Internet 130 via server 108. Each of the DSLAM line cards operates under the control of a DSLAM controller 110 which handles global provisioning, e.g. allocation of subscriber lines to AFE and DSP resources. The various components on the line card form a plurality of logical modems, a.k.a. transceivers, each handling upstream and downstream communications across corresponding subscriber lines. When an X-DSL communication is established on a subscriber line, a specific channel identifier is allocated to that communication. That identifier is used in the above mentioned packet based embodiment to track each packet as it moves in an upstream or downstream direction between the AFE and DSP.

The termination at the remote site may be either a physical or logical modem, a.k.a. transceiver.

Two forms of crosstalk are shown. FEXT occurs as a result of transmissions to the remotes on subscriber lines 172 and 176 leaking into transmissions 194 from the CO on subscriber line 174. This leakage is represented by arrows 182,186 from subscriber lines 172, 176 respectively into the channel 194 received at modem 158. Near end cross-talk (NEXT) results from transmissions from the CO leaking over into reception at that same location. This leakage is represented by arrows 192,196 from disturber subscriber lines 172, 176 respectively into the channel 194 received at the CO on the victim subscriber line 174. Self-NEXT, a.k.a. echo, occurs on every subscriber line including line 174.

Figure 2A:
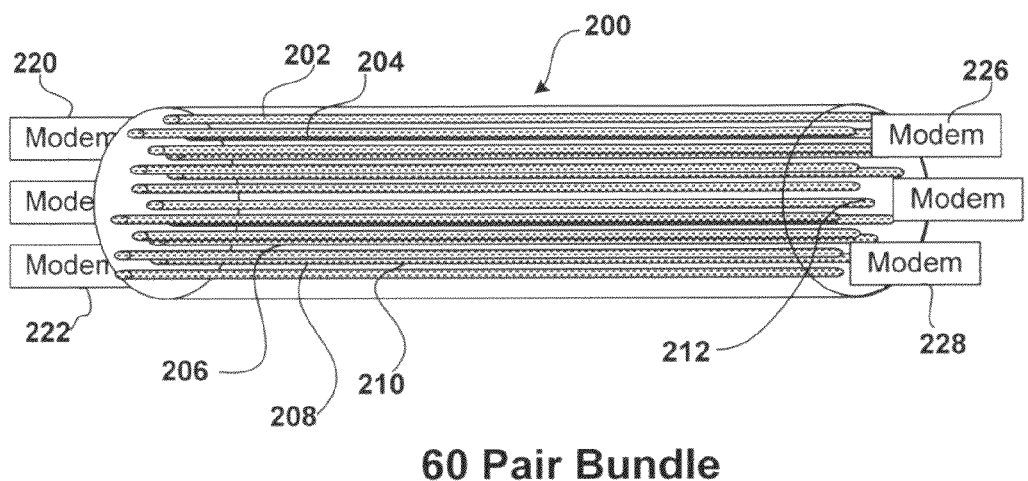
FIG. 2A is a hardware block diagram of an opposing sets of transceiver s coupled to one another by corresponding subscriber lines within a bundle.

FIG. 2A is a hardware block diagram of an opposing sets of transceivers coupled to one another by corresponding subscriber lines within a bundle 200. Within one of the opposing sets, transceivers 220-222 are referenced. Within another of the opposing sets transceivers 226,228 are referenced. Within the bundle which may include 60 or more subscriber lines, lines 202-212 are referenced.

Figure 2B:
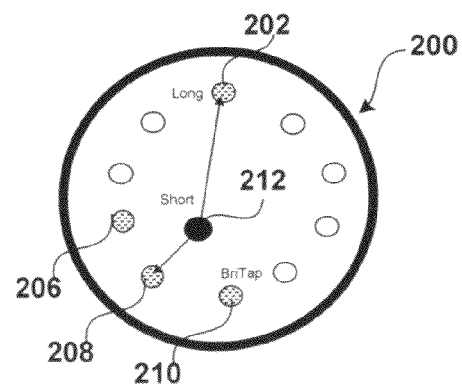
FIG. 2B is a cross-sectional view of the subscriber lines in the bundle shown in FIG. 2A.

FIG. 2B is a cross-sectional view of the subscriber lines in the bundle shown in FIG. 2A. Subscriber lines 202-212 are referenced. Any digital communication experiences signal interference, and communication protocols which support multiple sub-channels such as DMT are no exception. Interference can affect both the amplitude and the phase of the sub-channels. Such noise can arise across the time and/or frequency domains. Each of the subscriber lines in a bundle shields or interferes with other lines in the bundle in varying amounts across the time and/or frequency domains. In prior art systems this aggregate behavior is crudely addressed by the requirement of a corresponding fixed PSD mask on any of the subscriber lines which implement multi-tone modulation. All subscriber lines blast out sub-carrier signals at levels up to but not in excess of the corresponding PSD mask regardless of the bit-loading on even the presence of any actual data modulated on any particular carrier.

The hybrid front end allows both the transmit and receive paths to couple to the same subscriber line and to provide duplex or bi-directional communications thereon. This capability comes at a price, specifically signal loss. Depending on the impedance balance the hybrid circuit of prior art modem design may result in significant leakage from the transmit path to the receive path limiting the data rate of the system.

Figure 3:
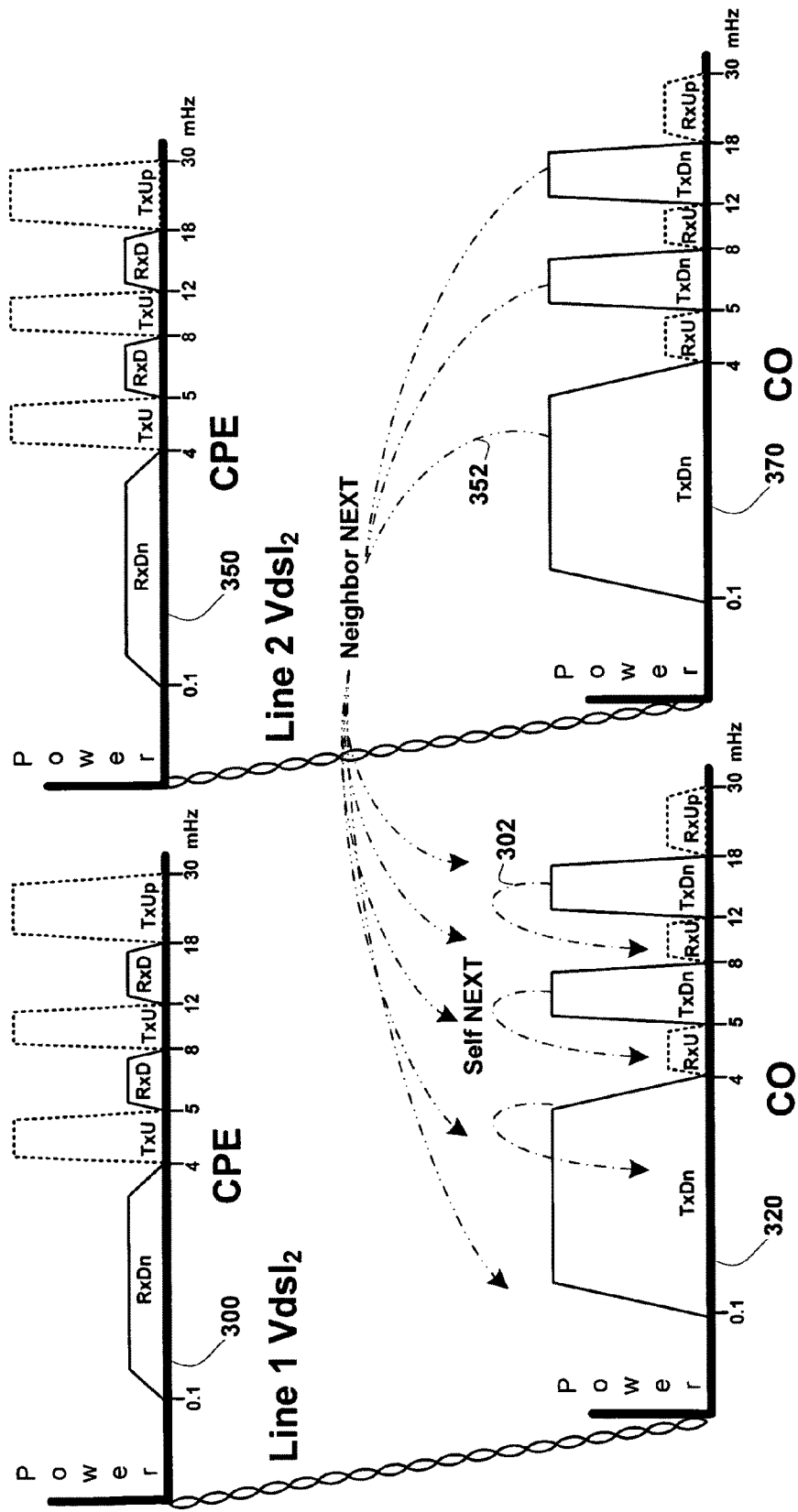
FIG. 3 is a signal diagram of the relative power of transmit and receive signals at the central office (CO) and customer premises equipment (CPE) and the coupling between subscriber lines via crosstalk.

FIG. 3 is a signal diagram of the relative power of transmit and receive signals at the central office (CO) and customer premises equipment (CPE) and the coupling between subscriber lines via crosstalk. The relative power at opposing modems on the CO and CPE are shown for two subscriber lines. The frequency division multiplexed (FDMA) band plans for upstream and downstream channels correspond to a VDSL band plan. Self-NEXT, a.k.a. echo, and neighbor NEXT are shown. Neighboring NEXT contributes substantial amounts of power to the receive path of the victim modem on Line 1.

Figure 4:
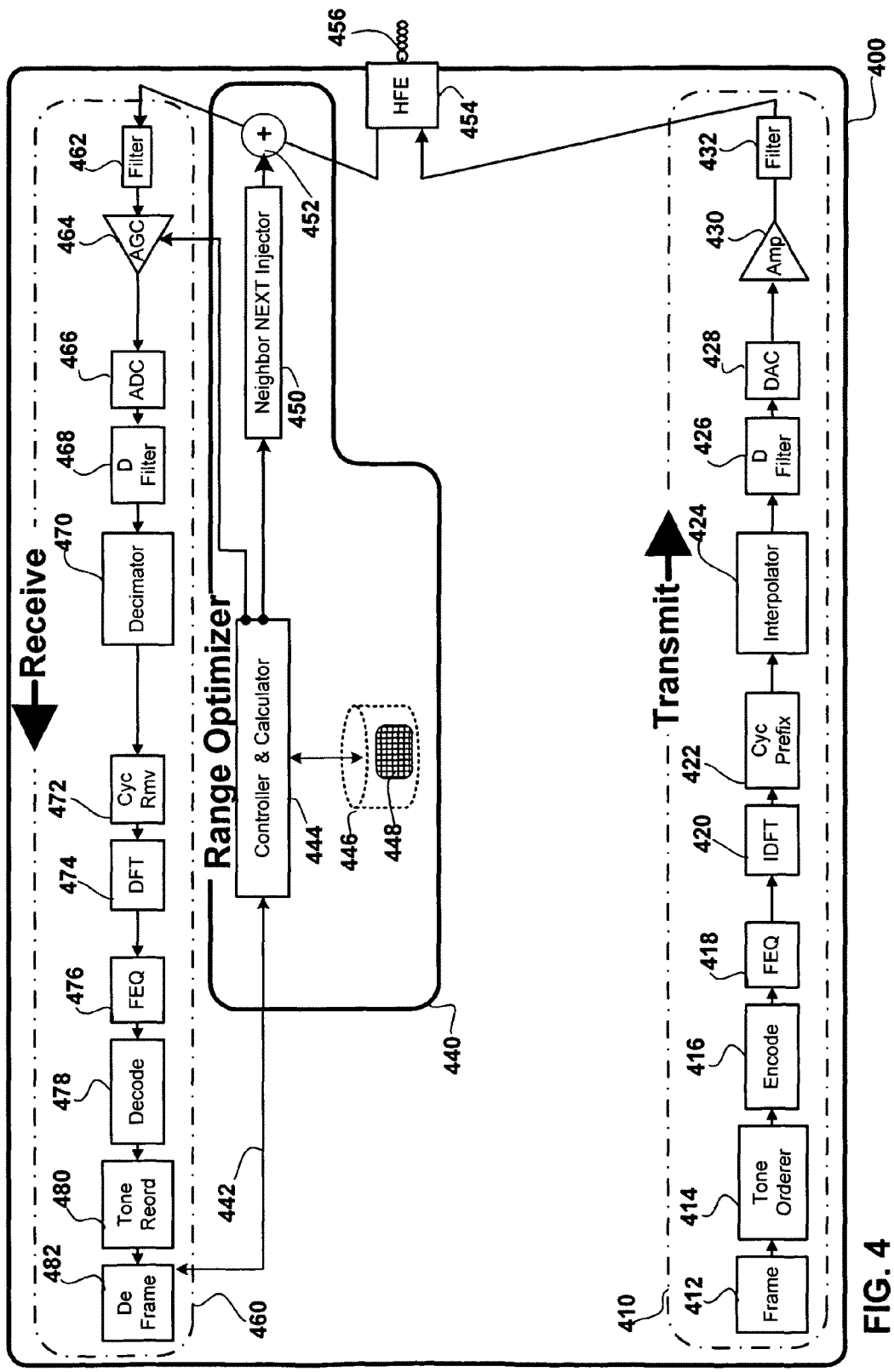
FIG. 4 is a hardware block diagram showing an embodiment of a transceiver of the current invention mounted on a line card in the central office shown in FIG. 1.

FIG. 4 is a hardware block diagram showing an XDSL transceiver 400 incorporating components for dynamic range optimization of the receive path. The transceiver includes a plurality of shared and or discrete components coupled to one another to form a transmit path 410, a receive path 460, a local range optimization module 440 and a hybrid front end (HFE) 454 which couples the transmit and receive paths of the transceiver to subscriber line 456.

The receive path 460 in this embodiment of the invention includes: analog filter 462, analog gain control (AGC) 464, analog-to-digital converter (ADC) 466, digital filter 468, decimator 470, cyclic prefix remover 472, discrete Fourier transform engine (DFT) 474, frequency domain equalizer 476, decoder 478, tone re-orderer 480 and deframer 482. In operation received data of each communication channel is subject to analog filtration and amplification. The received data is then digitized in the ADC followed by digital filtration, if any. Next received data is subject to any required decimation in the decimator. Next the cyclic prefix or suffix of each data symbol is removed. Each symbol of data is then transformed from the time to the frequency domain in the DFT and subject to equalization in the frequency domain. Each symbol of data is then decoded in decoder and serialized in the tone re-orderer. The demodulated data is then de-framed in the de-framer and transferred to the ATM, Ethernet or other network to which the transceiver is coupled.

The transmit path 410 includes: framer 412, tone orderer 414, encoder 416, frequency to domain equalizer 418, inverse discrete Fourier transform engine (IDFT) 420, cyclic prefix wrapper 422, interpolator 424, digital filter 426, digital-to-analog converter (DAC) 428, line driver 430 and filter 432. In operation transmitted data of each communication channel is framed in the framer, loaded bit by bit into corresponding tone bins by the tone-orderer, converted to a complex number representation of the corresponding point in the symbol constellation and subject to frequency domain equalization. Then each set of resultant tones, a.k.a. a symbol, is transformed from the frequency domain to the time domain in the IDFT. Subsequently any required cyclic suffix or prefix is added and the resultant data in the time domain is subject to interpolation in interpolator. After filtering in the digital filter the interpolated data is passed to the DAC. The DAC converts the digitized data of each communication channel to corresponding analog signals. These analog signals are amplified by the line driver. The amplified output of the line driver is passed to analog filter and then via HFE 454 to subscriber line 456.

In an embodiment of the invention the transceiver also includes a range optimizer 440. This module handles the adjustment of the dynamic range of the receive path to accommodate an anticipated increase in received signal levels resulting from NEXT disturbers.

The range optimizer in an embodiment of the invention includes: controller and calculator 444, storage 446, neighbor NEXT injector 450 and summer 452. In an embodiment of the invention storage 448 includes a model of the modem's transmit and receive path components. The range optimizer is coupled to one or more components on the receive path including the AGC 464.

The range optimizer receives the $NEXT_{transferred}$ from a DSLAM or other control entity. In an embodiment of the invention the range optimizer utilizes direct injection of the $NEXT_{transferred}$ into the receive path to initiate determination of the optimal dynamic range for the receive path. The controller and calculator 444 of the range optimizer configures the neighbor NEXT injector 450 to inject a signal corresponding to the $NEXT_{transferred}$ disturber profile shown in FIG. 5B into the receive path of the modem via the summer 452.

In another embodiment of the invention dynamic range optimization is achieved via a calculation of receive path response to the anticipated power increase of the receive signal resulting from the transferred NEXT. The controller and calculator of the range optimizer scales the distributed $NEXT_{transferred}$ disturber profile from the DSLAM to reflect the anticipated spectral shaping brought about by the subject modem's own receive path components. These calculations utilize the receive path hardware model 448 in the storage 446 to which the range optimizer is coupled. The modem determines the increase in power in the received analog signal in the time domain resulting from the shaped next. Next the subject modem calculates the required gain level for the analog gain control (AGC) to avoid clipping of the received signal mixed with the added power resulting from the anticipated NEXT disturbers. This calculation is performed using the modems own receive path hardware model 448 and the $NEXT_{transferred}$ disturber model received from the DSLAM.

Next the range optimizer sets the gain level of the AGC to narrowly avoid clipping. Continued analysis of the training signal is made so as to determine whether clipping of the received signal is still taking place. If it is the process may be repeated with new AGC level settings. After the optimal AGC level has been set the remaining processes of the training phase are completed, including the determination of optimal bitloading levels on each of the DMT tones. After training is complete the modem enters showtime phase of operation in which the established communication channels are used to transport user data.

The hardware blocks shown in this and the following figures may be alternately implemented in software or firmware. The transmit and receive path described above and the scalable components thereof may be applied with equal advantage in embodiments of the invention where a plurality of XDSL channels are multiplexed on the transmit and receive path of the transceiver. The transmit and receive path components may be coupled to one another either by packet based transfer of successive packetized portions of a communication channel or by dedicated point-to-point coupling between components. In still another embodiment of the invention the pseudo link management processes may be implemented on card in pseudo link management unit, 138 (See FIG. 1).

The components shown in FIG. 4 collectively comprise a physical transceiver. In alternate embodiments of the invention the functions performed by the components may be implemented on a logical transceiver implemented on a combined digital signal processor (DSP) and analog front end (AFE) such as that shown on the line card 134 in FIG. 1.

FIGS. 5A-5C and 5D-5F are frequency and time domain signal diagrams respectively of neighbor NEXT as it effects the receive path of a modem.

FIG. 5A is a signal diagram of power level vs. frequency resulting from the raw aggregate power spectral density (PSD) of all disturbers in a bundled line. The PSD profiles are of two types. The first type of PSD profiles, $NEXT_{raw}$, are labeled 520, 522 and correspond to the PSD profiles associated with the transmit portion of the disturbers frequency division multiplexed band plan. These aggregate PSD profiles result in what is identified as neighbor near end crosstalk (NEXT) on the receive path of a given victim line. The second type of PSD profiles are labeled 500, 502 and correspond to the PSD profiles associated with the receive portion of the disturbers frequency division multiplexed band plan. These aggregate PSD profiles result in what is identified as neighbor far end crosstalk (FEXT) on the receive path of the given victim line. In an embodiment of the invention the raw aggregate PSD profiles are determined by the digital subscriber line access multiplexer (DSLAM).

FIG. 5B is a signal diagram of noise level vs. frequency resulting from scaling of the $NEXT_{raw}$ PSD profiles by a NEXT transfer function. $NEXT_{transferred}$ disturber PSD profiles 524 and 526 are shown. The following Equation 1 shows such a NEXT transfer function:

$$|H_{NEXT}(f)|^2 = K_{NEXT} \times f^{3/2}$$ Equation 1 where "f" is frequency and "K" is a constant. The NEXT transfer function models the amount of coupling of the $NEXT_{raw}$ aggregate disturber PSD onto the transmit path of the victim modem. The anticipated NEXT noise on the victim modem's receive path resulting from the $NEXT_{raw}$ aggregate disturber transmit PSD is shown in FIG. 5B and calculated as shown in the following Equation 2:

$$NEXT_{TransferredNoise} = |H_{NEXT}(f)|^2 \times NEXT_{RAW}$$ Equation 2 where the raw aggregate NEXT disturber profile is multiplied by the absolute value of the square of the NEXT transfer function.

FIG. 5C shows the $NEXT_{transferred}$ of FIG. 5B after shaping by the victim modem, to reflect the specifics spectral responsiveness of that modem's receive path components. NEXT disturber PSD profiles 534 and 536 are shown after such shaping to reflect receive path characteristics.

FIGS. 5D-5F are time domain signal diagrams showing the anticipated effects of the aggregate NEXT disturbances on the receive path of the victim modem.

FIG. 5D shows the received multi-tone modulated signal 550 in the time domain and without neighboring NEXT. The range 556 of that signal extends between an upper bound 554 and a lower bound 552, which are set to avoid clipping.

FIG. 5E shows the anticipated increase in amplitude of the received signal 560 resulting from the added power from the aggregate NEXT disturbers. Range 566 and upper and lower bounds 564 and 562 correspond to the range set in FIG. 5D with one important difference. Absent any adjustment to the range of the receive path signal processing, a considerable portion of the received signal will be corrupted due to the clipping resulting from the increased amplitude of the received signal resulting from the anticipated aggregate NEXT disturbers. The following Equation 3 shows how such anticipated power increase delta is calculated from the disturber model provided by the DSLAM.

$$\Delta = \Sigma_{\Omega} NEXT_{Shaped}(f) df$$ Equation 3

$\Delta$ is the power that gets added to the time domain signal, resulting in an increase in amplitude. $\Omega$ is the out of band, i.e. transmit frequencies comprising the aggregate NEXT disturbers.

FIG. 5F shows the dynamic range of the receive path of the victim modem in accordance with the current invention. Specifically the range is expanded to allow processing of the received signal 570 with the additional power resulting from the anticipated NEXT to disturbances. Upper and lower signal processing boundaries 574 and 572 are expanded to allow a broader range 576 of signals to be processed without clipping. The expanded range is referred to as "optimized" because it is just large enough to accommodate the anticipated NEXT and no larger. If it were larger the receive path processing would be degraded due to an increase in quantization noise in the ADC.

Figure 6:
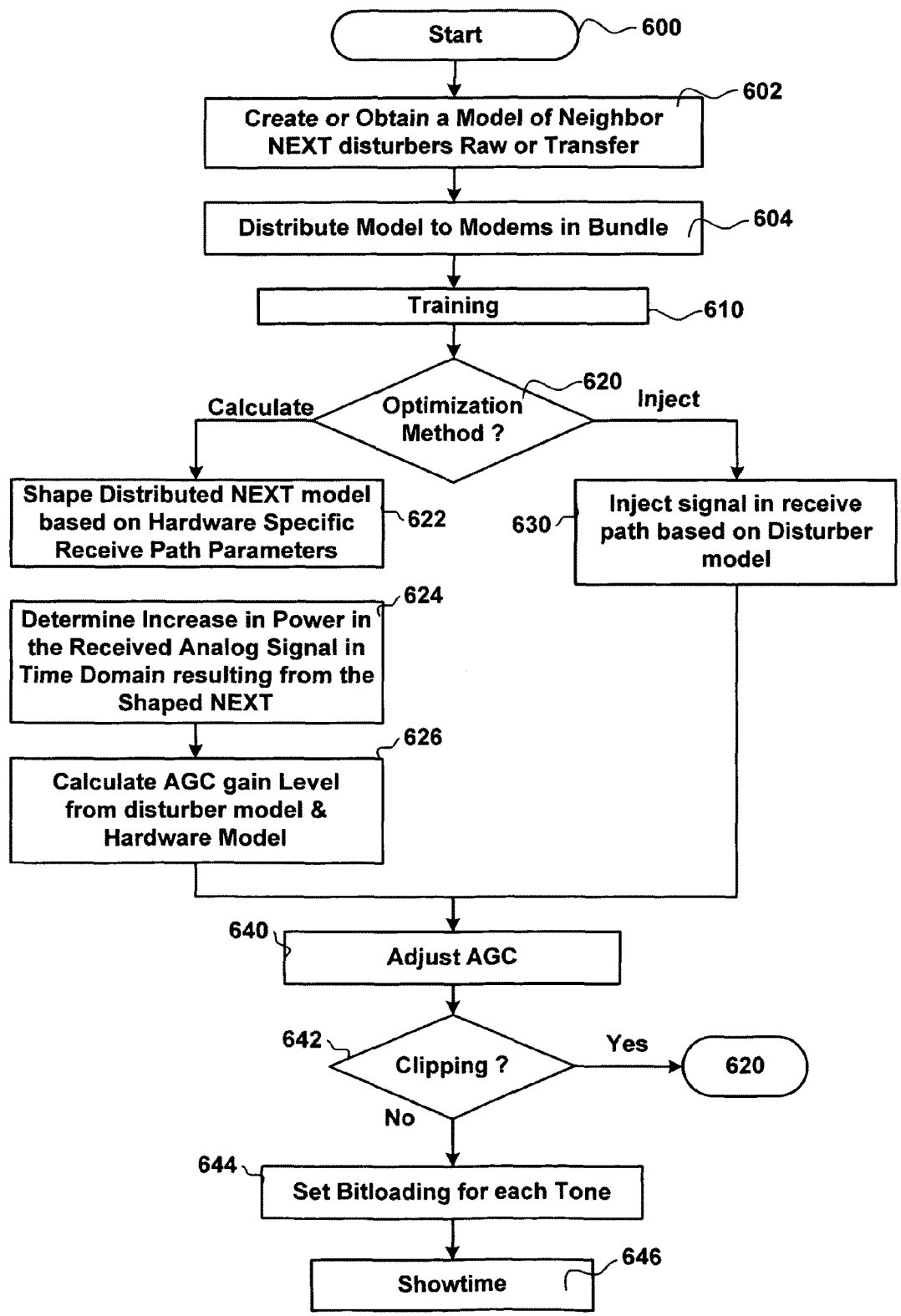
FIG. 6 is a process flow diagram of the processes associated with dynamic range optimization in accordance with the current invention.

FIG. 6 is a process flow diagram of the processes associated with dynamic range optimization in accordance with the current invention. After startup 600 in which the modem is initialized control passes to process 602. In process 602 the DSLAM calculates or obtains a raw NEXT disturber profile shown in FIG. 5A. In an embodiment of the invention the DSLAM uses a transfer function to transforms the raw NEXT disturber profile into the transfer NEXT disturber profile shown in FIG. 5B. This transfer profile reflects the degree of coupling between victim and disturber lines. In an alternate embodiment of the invention this transformation can be calculated by the modem's range optimizer, as discussed above in connection with FIG. 4, ref. 440.

Control is then passed to process 604 in which the raw or transformed NEXT disturber profile is passed to one or more modems by the DSLAM. Next in process 610 the subject modem initiates the training phase of its operation in which channel parameters are established with the remote modem, and at the conclusion of which actual communications channels are established. During training, a determination is made in decision process 620 as to which dynamic range optimization method will be executed.

If optimization via direct injection is enabled then control passed to process 630. In process 630 the range optimizer 440 configures the Neighbor NEXT injector 450 to inject a signal corresponding to the NEXT disturber profile shown in FIG. 5B into the receive path of the modem, as discussed above in connection with FIG. 4. Control then passes to process 640.

If alternately, a determination is made in decision process 620 that dynamic range adjustment via calculation is enabled then control passes to process 622. In process 622 the modem's dynamic range optimizer scales the distributed NEXT disturber profile from the DSLAM to reflect the anticipated spectral shaping brought about by the subject modem's own receive path components. Then in process 624 the modem determines the increase in power in the received analog signal in the time domain resulting from the shaped next calculated in the prior step. In the following step 626 the subject modem calculates the required gain level for the analog gain control (AGC) to avoid clipping of the received signal mixed with the added power resulting from the anticipated NEXT disturbers. This calculation is performed using the modems own receive path hardware model and the NEXT disturber model received from the DSLAM.

Next control is passed to process 640 in which the gain level of the AGC is set to avoid clipping. Then in decision process 642 a determination is made as to whether clipping of the received signal is still taking place. If it is, control returns to decision process 620. If no clipping is taking place, then control passes to process 644 in which the bitloading of each tone is set. Then in process 646 the modem enters showtime phase of operation in which the communication channels established on the subscriber line are used for the transport of user data, e.g. Video, Audio, or files.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A digital subscriber line 'XDSL' communication system for provisioning multi-tone modulated communications over a subscriber line, and the communication system comprising:
   a digital subscriber line access multiplexer (DSLAM) for distributing a near end crosstalk (NEXT) model of anticipated disturbance from neighboring disturber subscriber lines; and
   at least one modem having shared and discrete components forming a transmit path and a receive path and the at least one modem coupled to the DSLAM and responsive to the distributed NEXT model there from to adjust a dynamic range of an analog portion of the receive path to accommodate the anticipated disturbance modeled in the distributed NEXT model, whereby the adjusted range is large enough to substantially avoid clipping of a received signal and at the same time not so large as to result in significant excess dynamic range.

2. The XDSL communication system of claim 1, wherein the receive path components of the at least one modem further comprises:
   an analog-to-digital converter (ADC) with an output coupled to remaining components of the receive path, and an input, and the ADC digitizing a received analog signal; and
   an analog gain control (AGC) with an input coupled to the received signal and an output coupled to the input of the ADC, and a level of the AGC utilized to adjust the dynamic range of the analog portion of the receive path.

3. The XDSL communication system of claim 1, wherein the at least one modem further comprises:
   an analog-to-digital converter (ADC) receive path component with an output coupled to remaining components of the receive path, and an input, and the ADC digitizing a received analog signal;
   an analog gain control (AGC) receive path component with an input coupled to the received signal and an output coupled to the input of the ADC, and a level of the AGC utilized to adjust the dynamic range of the analog portion of the receive path; and
   a range optimizer component coupled to the receive path, and responsive to the NEXT model to adjust a dynamic range of an analog portion of the receive path by injecting a disturber signal into the receive path during a training phase of operation and by adjusting the AGC to substantially avoid clipping thereof.

4. The XDSL communication system of claim 1, wherein the at least one modem further comprises:
   an analog-to-digital converter (ADC) receive path component with an output coupled to remaining components of the receive path, and an input, and the ADC digitizing a received analog signal;
   an analog gain control (AGC) receive path component with an input coupled to the received signal and an output coupled to the input of the ADC, and a level of the AGC utilized to adjust the dynamic range of the analog portion of the receive path; and
   a range optimizer component coupled to the receive path, and responsive to the NEXT model to adjust a dynamic range of an analog portion of the receive path by calculating the anticipated disturbance modeled in the distributed NEXT model during a training phase of operation and by adjusting the AGC to substantially avoid clipping thereof.

5. An XDSL modem for provisioning XDSL multi-tone modulated communications over a subscriber line, and the modem comprising:
   a plurality of shared and discrete components forming a transmit path and a receive path for modulating and demodulating an XDSL communication channel;
   a near end crosstalk (NEXT) model of anticipated disturbance from neighboring disturber subscriber lines;
   a range optimizer component coupled to the receive path, and responsive to the NEXT model to adjust a dynamic range of an analog portion of the receive path to accommodate the anticipated disturbance modeled in the distributed NEXT model, whereby the adjusted range is large enough to substantially avoid clipping of a received signal and at the same time not so large as to result in significant excess dynamic range.

6. The XDSL modem of claim 5, wherein the receive path components of the at least one modem further comprise:
   an analog-to-digital converter (ADC) with an output coupled to remaining components of the receive path, and an input, and the ADC digitizing a received analog signal; and
   an analog gain control (AGC) with an input coupled to the received signal and an output coupled to the input of the ADC, and a level of the AGC utilized to adjust the dynamic range of the analog portion of the receive path.

7. The XDSL modem of claim 5, wherein the modem further comprises:
   an analog-to-digital converter (ADC) receive path component with an output coupled to remaining components of the receive path, and an input, and the ADC digitizing a received analog signal;
   an analog gain control (AGC) receive path component with an input coupled to the received signal and an output coupled to the input of the ADC, and a level of the AGC utilized to adjust the dynamic range of the analog portion of the receive path; and a range optimizer component coupled to the receive path, and responsive to the NEXT model to adjust a dynamic range of an analog portion of the receive path by injecting a disturber signal into the receive path during a training phase of operation and by adjusting the AGC to substantially avoid clipping thereof.

8. The XDSL modem of claim 5, wherein the modem further comprises:

an analog-to-digital converter (ADC) receive path component with an output coupled to remaining components of the receive path, and an input, and the ADC digitizing a received analog signal;

an analog gain control (AGC) receive path component with an input coupled to the received signal and an output coupled to the input of the ADC, and a level of the AGC utilized to adjust the dynamic range of the analog portion of the receive path; and a range optimizer component coupled to the receive path, and responsive to the NEXT model to adjust a dynamic range of an analog portion of the receive path by calculating the anticipated disturbance modeled in the distributed NEXT model during a training phase of operation and by adjusting the AGC to substantially avoid clipping thereof.

9. A method for operating an XDSL modem having shared and discrete components forming a transmit path and a receive path for multi-tone modulated XDSL communications, and the method comprising:

obtaining a near end crosstalk (NEXT) model of anticipated disturbance from neighboring disturber subscriber lines;

adjusting a dynamic range of an analog portion of the receive path to accommodate the anticipated disturbance modeled in the distributed NEXT model, whereby the adjusted range is large enough to substantially avoid clipping of a received signal and at the same time not so large as to result in significant excess dynamic range.

10. The method for XDSL communication of claim 9, further comprising:

adjusting a gain of the received signal to substantially avoid clipping of the received signal including the anticipated disturbance thereto resulting from neighboring disturber subscriber lines.

11. The method for XDSL communication of claim 9, further comprising:

injecting a disturber signal into the receive path during a training phase of operation; and adjusting a gain of the received signal to substantially avoid clipping thereof.

12. The method for XDSL communication of claim 9, further comprising:

calculating the anticipated disturbance modeled in the distributed NEXT model during a training phase of operation; and adjusting a gain of the received signal to substantially avoid clipping thereof.

13. A means for operating an XDSL modem having shared and discrete components forming a transmit path and a receive path for multi-tone modulated XDSL communications, and the method comprising:

means for obtaining a near end crosstalk (NEXT) model of anticipated disturbance from neighboring disturber subscriber lines;

means for adjusting a dynamic range of an analog portion of the receive path to accommodate the anticipated disturbance modeled in the distributed NEXT model, whereby the adjusted range is large enough to substantially avoid clipping of a received signal and at the same time not so large as to result in significant excess dynamic range.

14. The means for XDSL communication of claim 13, further comprising:

means for adjusting a gain of the received signal to substantially avoid clipping of the received signal including the anticipated disturbance thereto resulting from neighboring disturber subscriber lines.

15. The means for XDSL communication of claim 13, further comprising:

means for injecting a disturber signal into the receive path during a training phase of operation; and means for adjusting a gain of the received signal to substantially avoid clipping thereof.

16. The means for XDSL communication of claim 13, further comprising:

means for calculating the anticipated disturbance modeled in the distributed NEXT model during a training phase of operation; and means for adjusting a gain of the received signal to substantially avoid clipping thereof.

\* \* \* \* \*

UNITED STATES PATENT AND TRADEMARK OFFICE
CERTIFICATE OF CORRECTION

PATENT NO. : 8,325,825 B2
APPLICATION NO. : 12/799607
DATED : December 4, 2012
INVENTOR(S) : Schelstraete et al.

It is certified that error appears in the above-identified patent and that said Letters Patent is hereby corrected as shown below:

In Column 2, Line 17, delete "two to" and insert -- two --, therefor.

In Column 5, Line 3, delete "transceiver s 226,228" and insert -- transceivers 226, 228 --, therefor.

In Column 6, Line 2, delete "frequency to" and insert -- frequency --, therefor.

In Column 8, Line 30, delete "NEXT to" and insert -- to --, therefor.

Signed and Sealed this
Fifth Day of February, 2013

Teresa Stanek Rea
*Acting Director of the United States Patent and Trademark Office*